(12) United States Patent
Phadke et al.

(10) Patent No.: US 11,424,684 B2
(45) Date of Patent: Aug. 23, 2022

(54) HIGH PERFORMANCE TWO STAGE POWER CONVERTER WITH ENHANCED LIGHT LOAD MANAGEMENT

(71) Applicant: Apple Inc., Cupertino, CA (US)

(72) Inventors: Vijay G. Phadke, Santa Clara, CA (US); Liang Zhou, San Jose, CA (US); Prudhvi Mohan Maddineni, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 16/897,714

(22) Filed: Jun. 10, 2020

(65) Prior Publication Data

US 2021/0391799 A1    Dec. 16, 2021

(51) Int. Cl.
*H02M 3/335* (2006.01)
*H02M 1/00* (2006.01)

(52) U.S. Cl.
CPC ....... *H02M 3/33569* (2013.01); *H02M 1/007* (2021.05); *H02M 1/0035* (2021.05); *H02M 1/0058* (2021.05)

(58) Field of Classification Search
CPC ............. H02M 3/33569; H02M 1/007; H02M 1/0035; H02M 1/0058; H02M 1/0067; H02M 3/335
See application file for complete search history.

(56) References Cited

U.S. PATENT DOCUMENTS

| | | | |
|---|---|---|---|
| 8,933,637 B2 | 1/2015 | Deng et al. | |
| 9,144,125 B2 | 9/2015 | Deng et al. | |
| 9,276,413 B1 | 3/2016 | Zhang | |
| 9,332,601 B2 | 5/2016 | Levy | |
| 9,455,620 B2 | 9/2016 | Yu et al. | |
| 9,654,007 B1 | 5/2017 | Childs | |
| 9,899,929 B2 | 2/2018 | Jitaru et al. | |
| 10,148,191 B2 | 12/2018 | Yan et al. | |
| 10,811,975 B1* | 10/2020 | Bala | H02M 7/219 |
| 11,038,427 B1* | 6/2021 | Harshey | H02M 1/0035 |
| 2008/0043494 A1* | 2/2008 | Jiao | H02M 3/337 363/16 |
| 2009/0244934 A1* | 10/2009 | Wang | H02M 3/33592 363/21.06 |

(Continued)

FOREIGN PATENT DOCUMENTS

CN    201345619 Y    11/2009
CN    103166449 B    10/2015

(Continued)

OTHER PUBLICATIONS

Taiwan Office Action for Taiwan Application No. 110116871 dated Oct. 7, 2021; 5 pgs.

(Continued)

*Primary Examiner* — Gary L Laxton
(74) *Attorney, Agent, or Firm* — Fletcher Yoder PC

(57) ABSTRACT

A two-stage power converter can incorporate a buck pre-regulator and a resonant bus converter. Such a converter may be operated to achieve unconditional soft switching operation (zero voltage switching a/k/a ZVS) over a wide input and output range, while delivering excellent power conversion efficiency at lower power levels and in a no load condition.

24 Claims, 13 Drawing Sheets

(56) References Cited

U.S. PATENT DOCUMENTS

| | | | |
|---|---|---|---|
| 2013/0320950 A1* | 12/2013 | Jin .......................... | H02M 1/44 |
| | | | 323/304 |
| 2014/0211515 A1* | 7/2014 | Tomioka ............... | H02M 3/158 |
| | | | 363/21.02 |
| 2020/0119642 A1* | 4/2020 | Zhang ................... | H02M 3/156 |
| 2020/0267871 A1 | 8/2020 | Takahara et al. | |
| 2021/0226470 A1* | 7/2021 | Luo ..................... | H02M 1/0009 |

FOREIGN PATENT DOCUMENTS

| | | |
|---|---|---|
| CN | 102835012 B | 1/2016 |
| CN | 104852607 B | 9/2017 |
| EP | 2532083 B1 | 2/2020 |
| JP | 6239208 B1 | 11/2017 |
| TW | I625925 | 6/2018 |

OTHER PUBLICATIONS

Indian Office Action for Indian Application No. 202114024830 dated Feb. 24, 2022; 5 pgs.

\* cited by examiner

HIGH PERFORMANCE TWO STAGE POWER CONVERTER WITH ENHANCED LIGHT LOAD MANAGEMENT

BACKGROUND

Electronic devices generally require some form of power supply. Power supply design is a constant tradeoff between required power, efficiency, size, and other parameters. In particular, AC/DC adapters used to provide mains power to portable consumer electronic devices such as laptop computers, tablet computers, smart phones, at the like impose a variety of conflicting requirements. First, as these devices become more and more powerful, both the amount of power delivered and the overall efficiency of the power supply adapters become important. Additionally, such adapters may, in many use cases, be left plugged into mains power even when the device they power has been disconnected. In this condition, it may be desirable to substantially limit the amount of power "wasted" by the adapter. Moreover, because such adapters are intended to be portable, i.e., the users may take them with them when they travel with the device, size is also an important constraint. Finally, as with all consumer products, complexity, can affect both reliability and cost.

SUMMARY

Based on the foregoing, it would be desirable to provide a power converter that addresses the afore-mentioned issues. In some embodiments, such a power converter may be used to provide a high-performance solution for low power, off-line AC/DC power converters, including those used in USB-C type AC/DC adapters or other low power consumer electronics power converters as well as other applications.

A two stage power converter can include a buck pre-regulator stage configured to receive an input voltage and produce an intermediate voltage lower than the input voltage and a resonant bus converter stage configured to receive the intermediate voltage produced by the buck pre-regulator stage and produce an output voltage that is a fixed multiple of the intermediate voltage. The converter may further include control circuitry coupled to the buck pre-regulator stage and the resonant bus converter stage, wherein the control circuitry is configured to perform at least one of adaptable soft switching boundary mode operation of the buck pre-regulator stage; and controlled burst mode operation of the resonant bus converter.

The resonant bus converter may be a half-bridge converter including first and second switching devices coupled in series across the intermediate voltage, first and second resonant capacitors coupled in series across the intermediate voltage, and a transformer having a primary winding coupled between a junction of the first and second switching devices and a junction of the first and second resonant capacitors, the transformer also having at least one secondary winding coupled to an output of the two stage converter by one or more rectifier devices. The first and second switching devices may be alternately operated 180 degrees out of phase at a duty cycle of about 50% with a dead time to prevent cross-conduction, thereby generating a sinusoidal current in the transformer primary winding. The resonant bus converter may also be configured to achieve zero voltage switching of the first and second switching devices. The first and second resonant capacitors may be configured to resonate with parasitic inductances of the transformer and layout or an additional a discrete inductor in series with transformer winding.

Alternatively, the resonant bus converter may be a full-bridge including first and second switching devices coupled in series across the intermediate voltage, third and fourth switching devices coupled in series across the intermediate voltage, and a resonant circuit including at least a resonant capacitor and a transformer primary winding coupled between a junction of the first and second switching devices and a junction of the third and fourth switching devices, wherein the transformer also having at least one secondary winding coupled to an output of the two stage converter by one or more rectifier devices. The first and third switching devices and the second and forth switching devices may be alternately operated 180 degrees out of phase at a duty cycle of about 50% with a dead time to prevent cross-conduction, thereby generating a sinusoidal current in the transformer primary winding. The resonant bus converter may be configured to achieve zero voltage switching of the first and second switching devices. The resonant circuit may include parasitic inductance of the transformer and layout or a discrete inductor in series with transformer winding.

The buck pre-regulator stage can include a first switching device and a second switching device coupled in series across the input voltage. The first switching device may be a power control switch, and the second switching device may be a reverse current control switch. A buck inductor may be coupled between a junction of the first and second switching devices and an input of the resonant bus converter. A free-wheeling diode may be coupled in parallel with the reverse current control switch. A first current sensor may be coupled to the control circuitry and configured to sense the buck pre-regulator current during an on time of the first switching device. A second current sensor may be coupled to the control circuitry and configured to sense freewheeling current during an off time of the first switching device. The first current sensor may be a current sense resistor connected in series with at least the buck inductor during an on time of the first switching device. The second current sensor may be a current sense resistor connected in series with the second switching device.

The control circuitry of the two stage power converter may be configured to perform adaptable soft switching boundary mode operation of the buck pre-regulator stage by: turning on the first switching device, causing a current flow through the buck inductor; comparing an output of the first current sensor to a peak current command derived by the control circuit from an output voltage of the two stage converter; turning off the first switching device when current through the buck inductor reaches the peak current; turning on the second switching device after turning off the first switching device; detecting, using the second current sensor, a reverse current through the second switching device; and responsive to the reverse current, turning on the first switching device in a zero voltage switching transition.

The control circuitry of the two stage power converter may be configured to perform controlled burst mode operation of the two-stage converter by: detecting a load condition at or below a point at which switching and bias power losses of the buck pre-regulator stage and conduction and magnetic core losses of the buck pre-regulator stage are in equilibrium; and responsive to such load condition, temporarily and intermittently disabling switching of the buck pre-regulator stage and the resonant bus converter stage. The control circuitry may be configured to detect the load condition at or below a point at which switching and bias power losses of the buck pre-regulator stage and conduction and magnetic core losses of the buck pre-regulator stage are in equilibrium by detecting a load current below a predetermined threshold. Temporarily and intermittently disabling switching of the buck pre-regulator stage and the resonant bus converter stage may include simultaneously disabling switching of the buck pre-regulator stage and the resonant bus converter stage or may include first disabling switching of the buck pre-regulator stage and subsequently disabling the resonant bus converter stage.

A method of operating a two-stage converter having a first buck pre-regulator stage and a second resonant bus converter stage can include adaptable soft switching boundary mode operation of the buck pre-regulator stage, by turning on a power control switching device of the buck pre-regulator stage, causing a current flow through a buck inductor of the buck pre-regulator stage; comparing a sensed current through the buck inductor to a peak current command derived from an output voltage of the two stage converter; turning off the first switching device when current through the buck inductor reaches the peak current; turning on a reverse current control switching device of the buck pre-regulator stage after turning off the first switching device; detecting a reverse current through the reverse current control switching device and responsive to the reverse current, turning on the power control switching device in a zero voltage switching transition.

The method of operating a two-stage converter having a first buck pre-regulator stage and a second resonant bus converter stage can alternatively or additionally include controlled burst mode operation of the resonant bus converter by: detecting a load condition at or below a point at which switching and bias power losses of the buck pre-regulator stage and conduction and magnetic core losses of the buck pre-regulator stage are in equilibrium, and responsive to such load condition, temporarily and intermittently disabling switching of the buck pre-regulator stage and the resonant bus converter stage. Detecting the load condition at or below a point at which switching and bias power losses of the buck pre-regulator stage and conduction and magnetic core losses of the buck pre-regulator stage are in equilibrium comprises detecting a load current below a predetermined threshold. Temporarily and intermittently disabling switching of the buck pre-regulator stage and the resonant bus converter stage can include simultaneously disabling switching of the buck pre-regulator stage and the resonant bus converter stage or can include first disabling switching of the buck pre-regulator stage and subsequently disabling the resonant bus converter stage.

DETAILED DESCRIPTION

Figure 1:
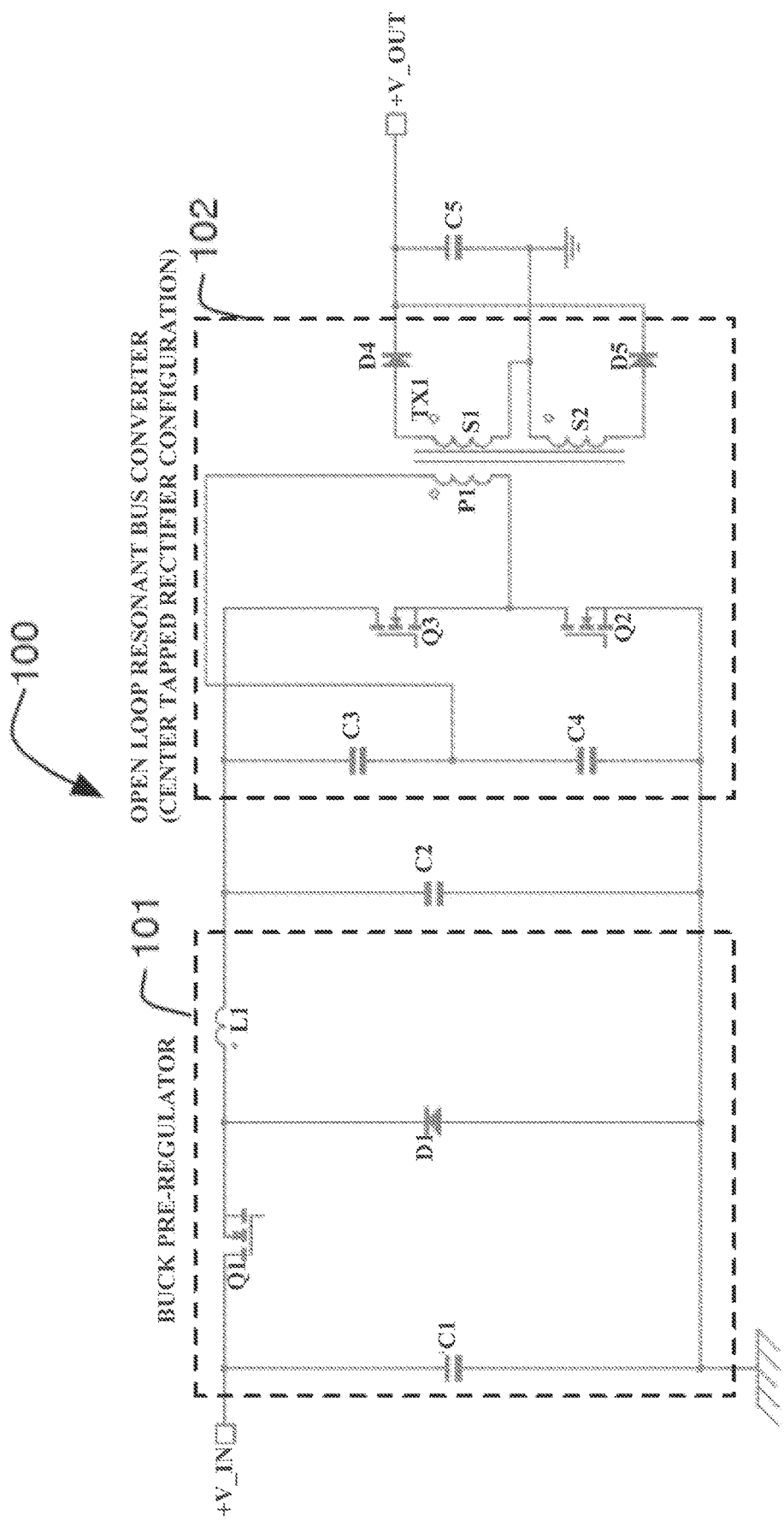
FIG. 1 illustrates one embodiment of a two-stage converter including a buck pre-regulator and a bus converter.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

A two-stage power converter can include a buck pre-regulator and an isolated bus converter. The isolated bus converter may be an isolation stage with fixed gain set by a transformer turns ratio. In such converters, the buck pre-regulator may control the input voltage of the bus converter so as to achieve desired voltage regulation at the output.

Figure 2:
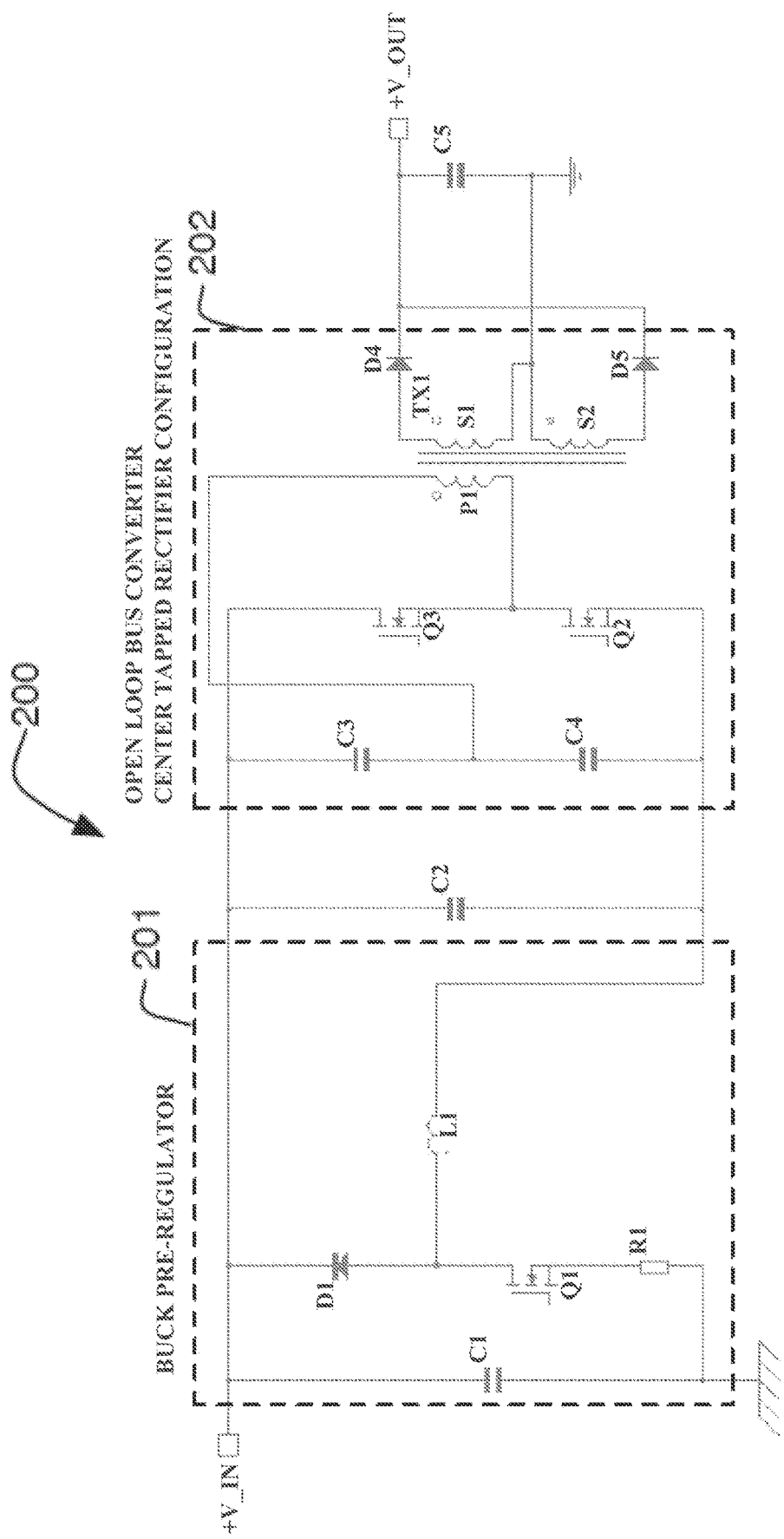
FIG. 2 illustrates an alternative embodiment of a two-stage converter including a buck pre-regulator and a bus converter.
Figure 3:
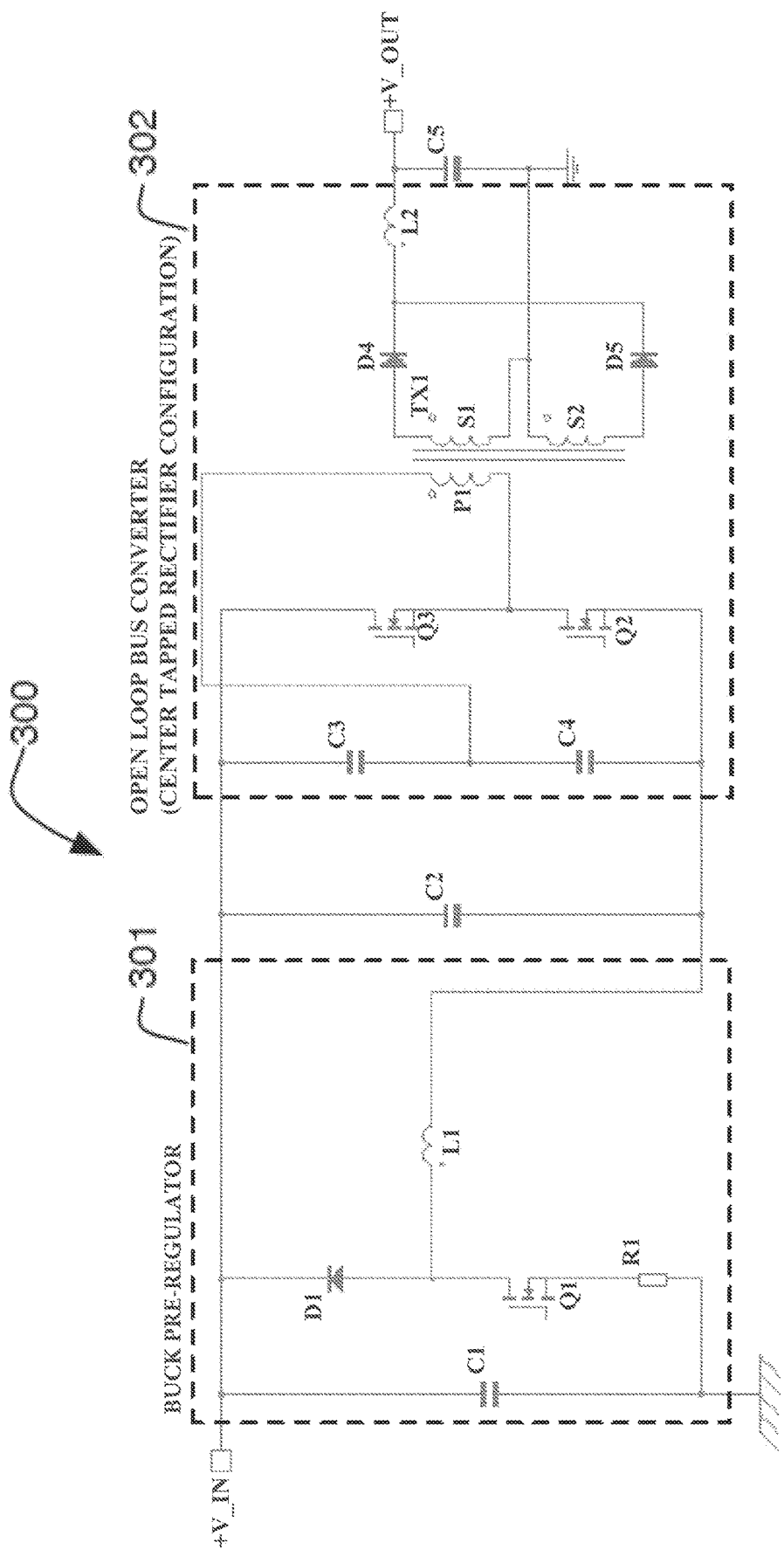
FIG. 3 illustrates yet another alternative embodiment of a two-stage converter including a buck pre-regulator and a bus converter, which includes an inductor in the output filter stage.

FIG. 1 illustrates one embodiment of such a two-stage converter, including buck pre-regulator 101 and bus converter 102. The output voltage of buck pre-regulator 101 appears across capacitor C2, which is the input to bus converter 102. FIG. 2 illustrates an embodiment of a similar converter. Converter 200 in FIG. 2 operates substantially the same as converter 100 in FIG. 1, except that the buck pre-regulator control MOSFET Q1 may be placed on the ground side for easier control. Bus converter 202 (or 102) may be driven using an isolated drive, such as a driver transformer or level shift driver. FIG. 3 illustrates a schematic of converter 300, which is still another variation of this architecture, and which includes an inductor L2 in the output filter stage.

Bus converter switches Q2 and Q3 operate 180 degrees out of phase and at close to 50% duty cycle, with a small dead time in between the switching transitions. This dead time may be introduced to avoid cross conduction of Q2 and Q3 and also to allow zero voltage switching (ZVS). The buck output voltage across capacitor C2 must be lower than the minimum expected input voltage, limited by maximum operating duty cycle of the buck controller. Bus converters 102/202 in FIGS. 1 and 2 may be a resonant bus converter operated in substantially boundary mode with near sinusoidal load current. The resonant frequency may be determined by the parasitic leakage inductance of the transformer and splitting capacitors C3 and C4. Energy stored in the magnetizing inductance may be used for the zero voltage switching (ZVS) transitions over the entire load range. Conversely, bus 302 converter depicted in FIG. 3 may operate with a substantially trapezoidal load current waveform. The zero-voltage transition may depend on the energy stored in the leakage inductance and, in some embodiments, may be achieved at higher loads.

In each of the foregoing embodiments, bus converter transformer TX1 may use a turns ratio selected to deliver a desired target output voltage. Transformer TX1 may also provide galvanic isolation, which may be a requirement in certain applications. A control circuit (not shown) may compare the output voltage +V_OUT with a fixed reference and may controls the buck converter MOSFET Q1 to achieve output voltage regulation.

Such systems may suffer from certain limitations. For example, the buck converter can be operated in transition or boundary mode, but it achieves zero voltage transitions only if the buck converter operates at duty cycle much higher than 50%. Further, if such converter is to be operated directly in a wide range of off-line applications, such as low power adapters (e.g., 90Vac to 264Vac input range), the efficiency of the buck converter may be poor or even quite poor. For example, at the lowest ac input voltage of 90Vac and at full load, +V_IN may be as low as 75 VDC near the valley of the bulk voltage. This, in turn, requires the buck converter output voltage to be very low, e.g., in the range of 60V~70V. Low line efficiency can be improved somewhat by using Q1 devices rated for very low on resistance; however, efficiency at high line voltages may be adversely impacted due to the corresponding higher capacitive hard switching losses.

Another limitation of such circuits is that bus converter transformer TX1 experiences fixed core losses because of operation at a fixed duty cycle and fixed input voltage. As a result, the fixed power consumption of the bus converter may adversely impact the efficiency and input power at very low load conditions, which are common operational modes for AC/DC adapters used in consumer electronics.

Figure 4:
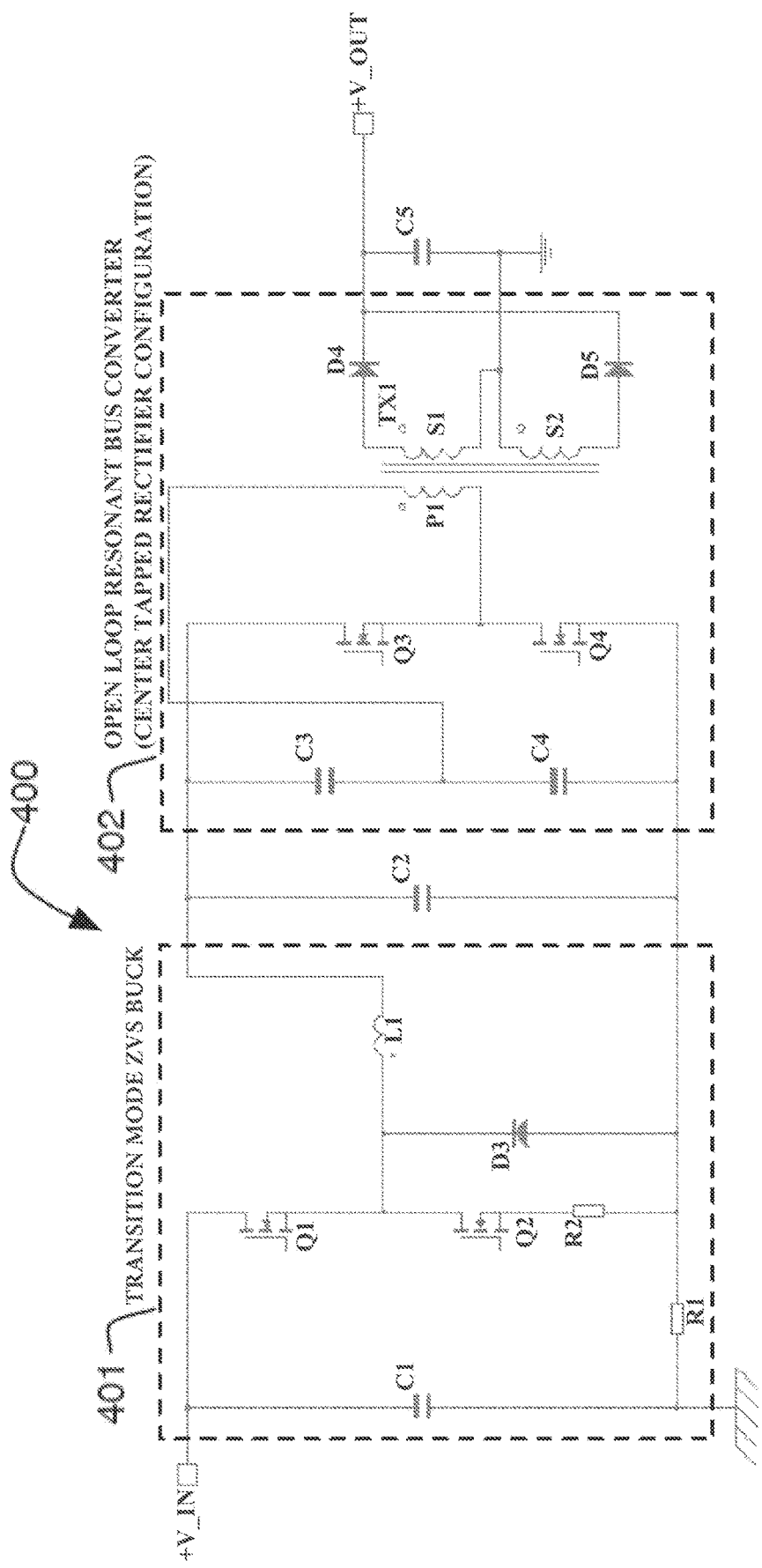
FIG. 4 illustrates a schematic of an improved two-stage power converter based on a buck pre-regulator and a bus converter.

FIG. 4 illustrates a schematic of an improved two-stage power converter 400, based on buck pre-regulator 401 and bus converter 402, described in greater detail below. Converter 400 may become an "enhanced" two-stage power converter by including one or more of at least two aspects selected and configured so as to deliver high performance in low power AC/DC power supply applications. These two aspects can include (1) a resonant bus converter with controlled burst operation and (2) an adaptable soft switching boundary mode buck pre-regulator, both of which are described in greater detail below.

Resonant Bus Converter

Figure 5:
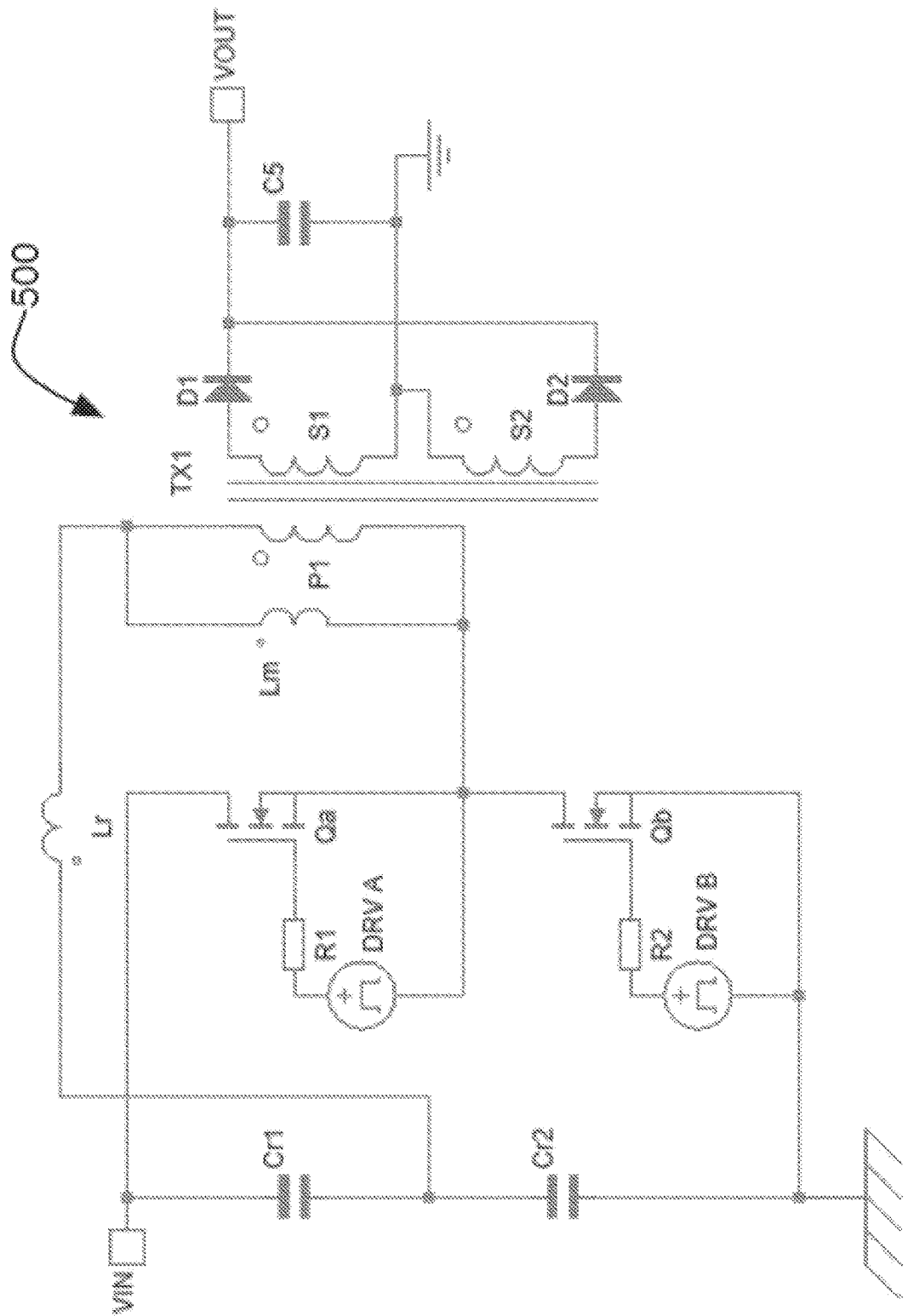
FIG. 5 illustrates an equivalent circuit of a resonant bus converter.

The inherent leakage inductance of bus converter transformer TX1, together with the external layout parasitic inductance of the converter may be used to build a resonant bus converter 500 that can operate at substantially unity gain. An equivalent circuit of such a resonant bus converter is illustrated in FIG. 5. Inductor Lr need not be a discrete inductor, but may be a combination of the transformer leakage inductance, primary side layout parasitic inductance, and the reflected secondary stray inductance. Additional inductance, for example in the form of a discrete inductor in series with the primary winding, may be provided. Additionally, the circuit layout may be designed to provide a desired level of stray and/or parasitic inductance. In any event, this inductance Lr, in combination with input splitting capacitors Cr1 and Cr2 can form a resonant tank circuit. The resonant time of this tank is given by:

$$2\pi\sqrt{Lr(Cr1+Cr2)}$$

MOSFETS Qa and Qb may be operated 180 degrees out of phase and at a substantially 50% duty cycle, except for a short dead time to prevent cross conduction of the two MOSFETS. This dead time may also be used for zero voltage switching (ZVS) transitions. Resonant bus converter 500 is sometimes also described simply as "Bus Converter" in the description that follows.

In some exemplary practical embodiments, MOSFETS Qa and Qb may operate with a dead time of about 100 ns to 500 ns, with a particular value selected based on the switching frequency and other circuit constraints. When Qa or Qb is turned on, Lr resonates with the combination of C3 and C4 to generate a sinusoidal current in the primary and respective secondary winding of transformer Tx1. The values of Cr1 and Cr2 may be chosen such that the half resonant time of the circuit ($\pi\sqrt{Lr(Cr1+Cr2)}$) is substantially equal to the on time of the MOSFETS. This will result in boundary mode operation at the resonant frequency in each half cycle. For performance optimization, the circuit may be designed to operate slightly above or below the resonant frequency in each half cycle.

As a result of the above-described switching operation, a triangular-shaped magnetizing current may also build in primary winding magnetizing inductance Lm. The primary inductance may be chosen so that adequate magnetizing current is built in the primary to achieve zero voltage switching transitions during the dead time while discharging the total "effective capacitance" across the respective MOSFET. This "effective capacitance" includes the parasitic drain-source capacitances of the two MOSFETS, reflected secondary side rectifier parasitic capacitance, and any shunt capacitance of the transformer. Thus, when each MOSFET turns off, the reflected secondary current has already fallen to zero or substantially near zero, and the magnetizing current is at its peak.

The turns ratio of transformer TX1 may be chosen to match any desired output voltage based on the target buck output voltage.

Because bus converter 500 operates in a zero voltage switching (ZVS) mode, it experiences no capacitive turn on switching losses. Also, at the time of turn off, the current in each MOSFET is very low (i.e., the magnetizing current). As a result, the turn off switching losses of bus converter 500 are also very low to the point of being virtually nonexistent. As a result, bus converter 500 effectively has only resistive losses, which can allow for operation at a very high frequency. Furthermore, the voltage transition during the switching dead time can have a very slow rise time, which can significantly reduce common mode noise emissions.

Figure 6:
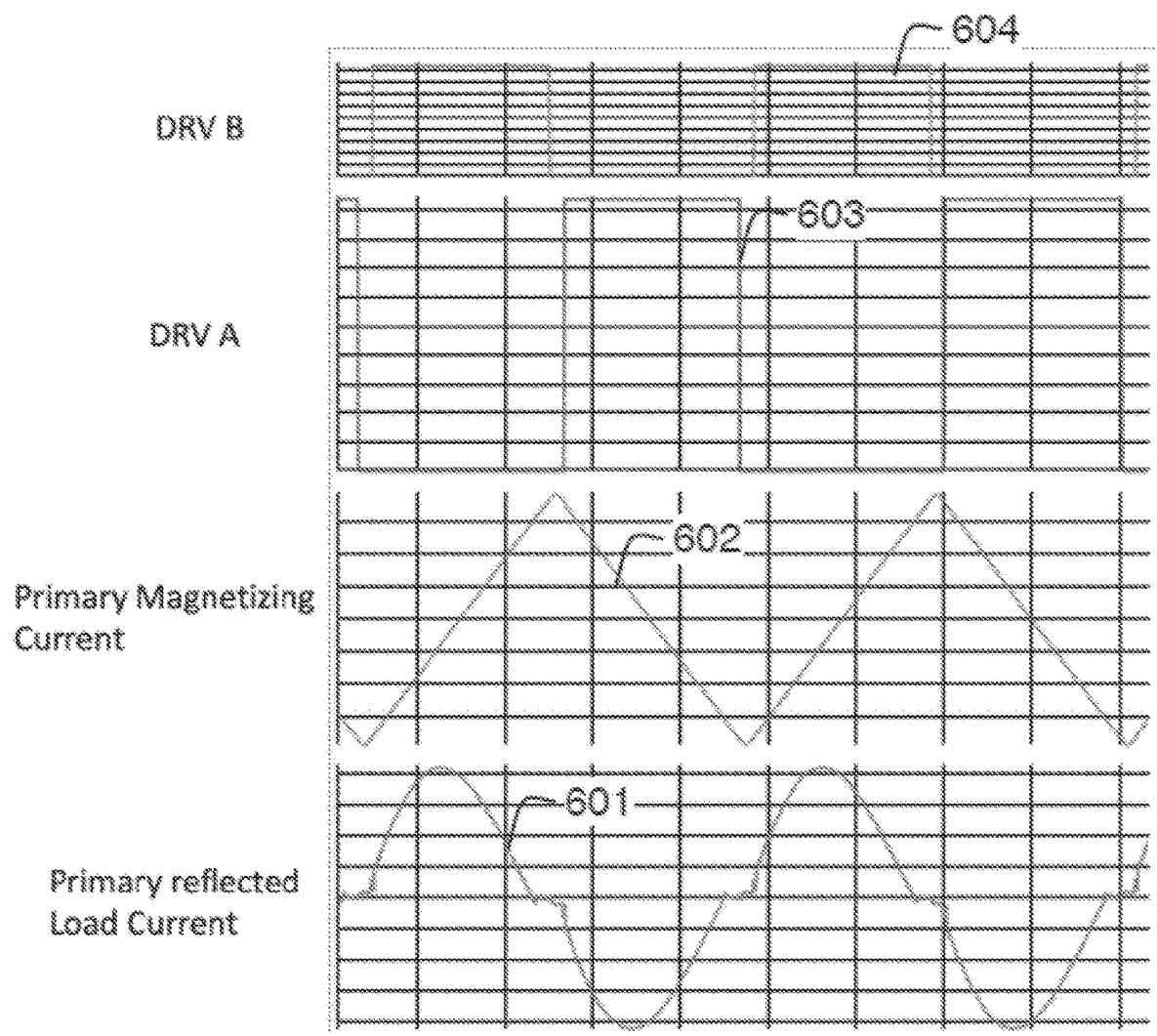
FIGS. 6 and 7 show certain waveforms depicting operation of a resonant bus converter 500 as depicted in FIG. 5.
Figure 7:
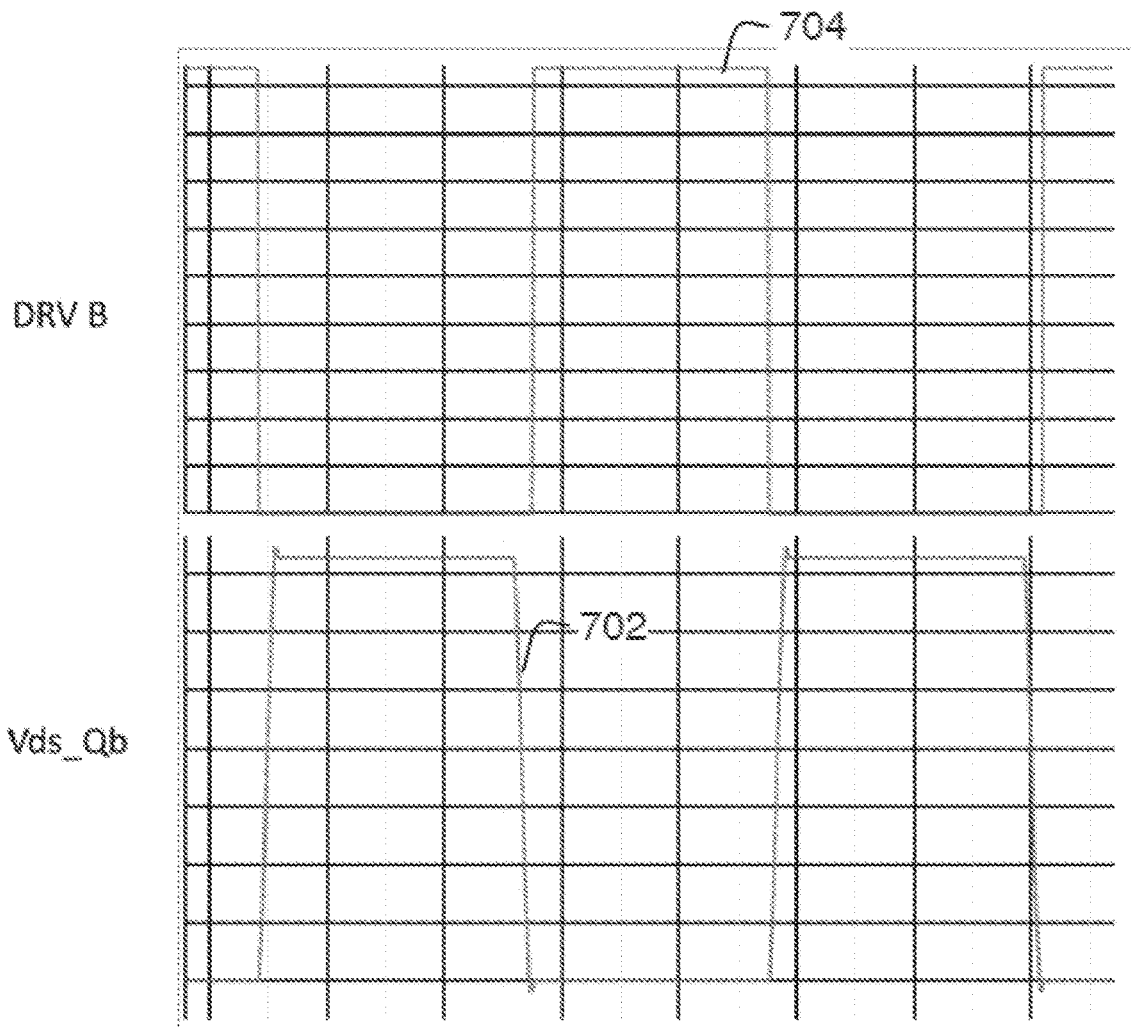

FIGS. 6 and 7 show certain waveforms depicting operation of a resonant bus converter 500 as depicted in FIG. 5. FIG. 6 illustrates primary reflected load current 601, which has sinusoidal nature and reaches zero level during the on time of the two MOSFET switches. More specifically, one half cycle of the sinusoidal load current corresponds to the on time of each respective switching device (illustrated by the switch drive signals 603 and 604). Primary magnetizing current 602 ramps in triangular manner when the switches are active. FIG. 7 illustrates the ZVS operation of the switches (particularly for switch Qb, although switch Qa is substantially similar, but 180 degrees out of phase). More specifically, FIG. 7 depicts the drive signal 704 for switch Qb (corresponding to drive signal 604 illustrated in FIG. 6). FIG. 7 also depicts the drain to source voltage 702 of switch, which, as can be seen is below zero at turn on.

Figure 8:
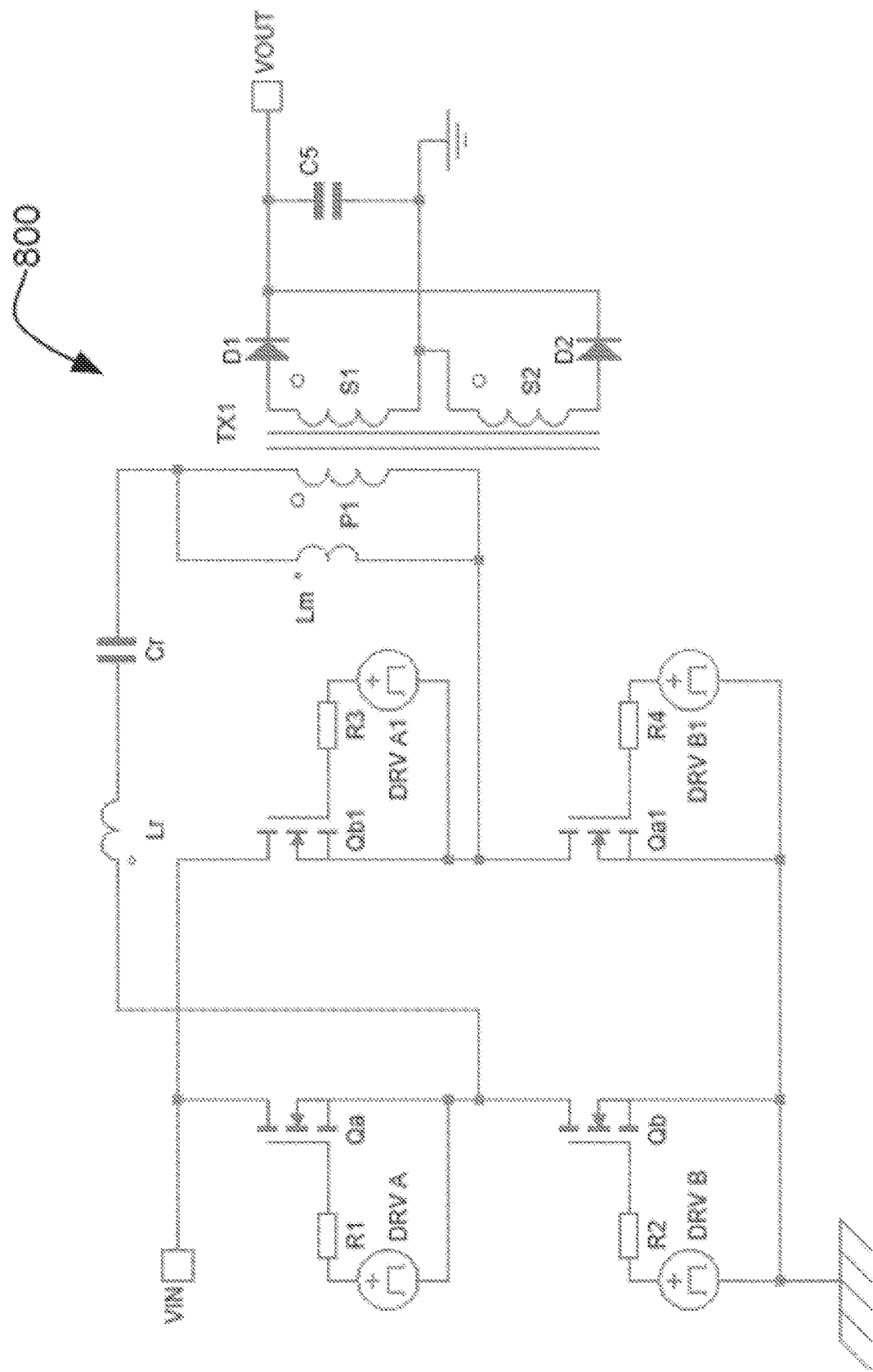
FIG. 8 illustrates a full bridge resonant converter.

The foregoing resonant bus converter 500 is a half bridge resonant bus converter. However, a resonant bus converter may also be constructed as a full bridge resonant bus converter 800 (illustrated in FIG. 8). MOSFETS Qa and Qa1 (i.e., corresponding switches in opposite bridge legs) may be driven simultaneously in one half cycle, while MOSFETS Qb and Qb1 may be driven simultaneously in the other half cycle. Leakage inductance Lr and series resonant capacitor Cr form a resonant tank. Circuit operation is substantially similar to the half bridge resonant bus converter discussed above with respect to FIGS. 5-7. In some embodiments, for example those delivering lower power levels, a half bridge resonant bus converter may be preferred because of reduced circuit complexity and part count; however, either embodiment may be used depending on particular application requirements.

Figure 9:
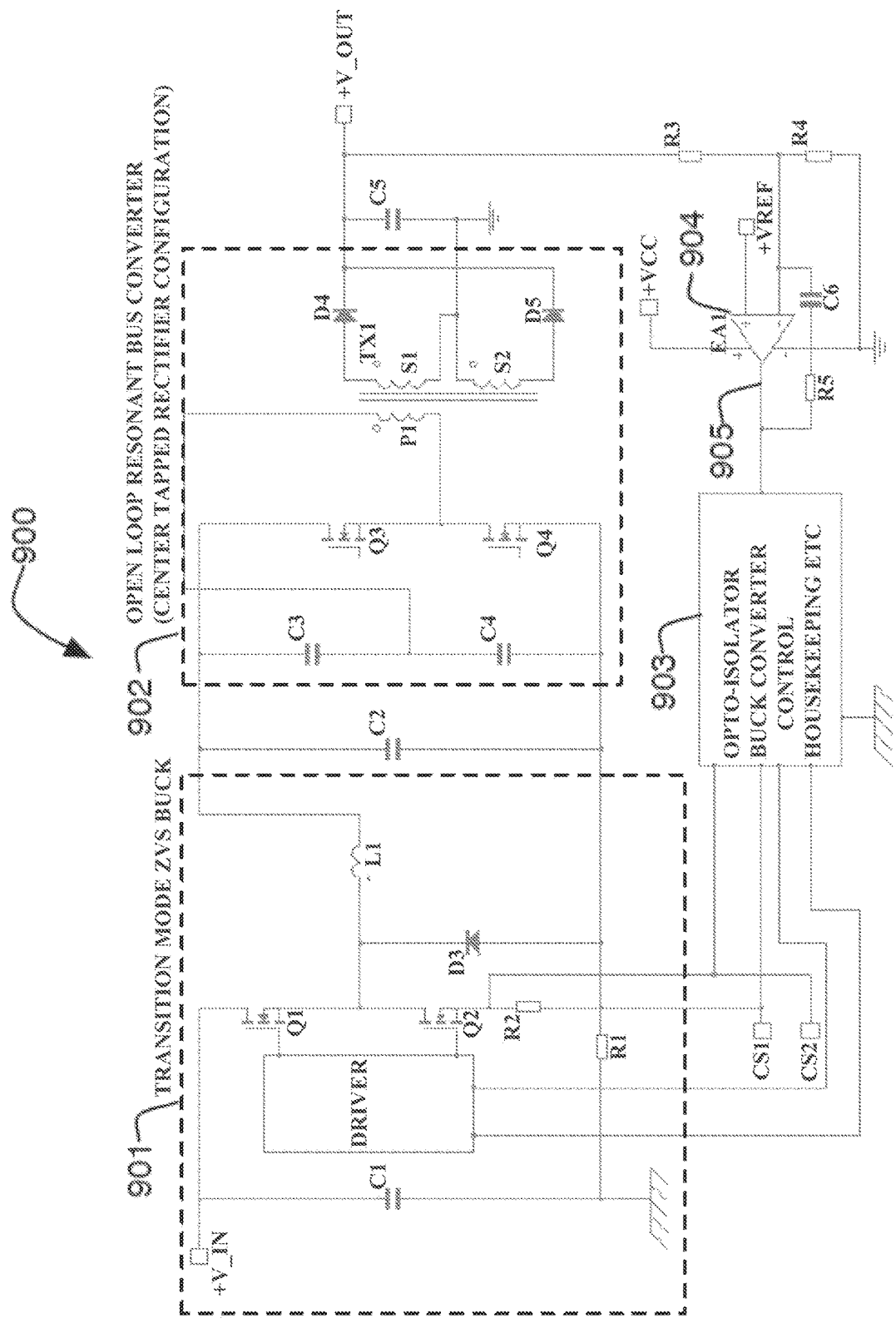
FIG. 9 illustrates another embodiment of a two-stage converter including a buck pre-regulator and a bus converter.

As discussed above, the illustrated resonant bus converters produce an output voltage that is a fixed multiple of their input voltage (the multiple being determined by the turns ratio of transformer Tx1). Because such resonant bus converters do not have capability to regulate their output voltage independently of their input voltage, a buck pre-regulator 901 may be combined with a resonant bus converter 902 to form a two stage converter 900, as illustrated in FIG. 9. MOSFETS Q1 and Q2 along with diode D3, inductor L1, and capacitor C2 form a buck pre-regulator stage 901. Switch Q1 acts as the power control switch in buck converter operation, and switch Q2 performs the function of reverse current control and/or ZVS control. Buck converter 901 may be operated in peak current control mode, with boundary mode operation. Diode D3 acts as the freewheeling rectifier of the buck converter. In some embodiments, switch Q2 can also act as an additional freewheeling element/synchronous rectifier. In some such embodiments, D3 may be omitted, depending, for example, on the particular semiconductor technology used. However, for at least some embodiments, it may be advantageous to keep diode D3.

Operation of buck converter 901 using the above-mentioned peak current mode control may be as follows. When switch Q1 turns on, current from input source+V_IN ramps up in to inductor L1, capacitor C2, the load impedance reflected through resonant bus converter, and finally current sense resistor R1, returning to input source. The current sense signal voltage across R1 (CS1) may be used by buck controller converter 903 to turn off switch Q1 the current value reaches the peak current limit set by the control circuit. An error amplifier 904 may be configured to compare the converter output voltage (+V_OUT) with a fixed reference (+VREF) to set the peak current limit for the buck converter, which may be a signal 905 provided to controller 903. In some embodiments, error amplifier 904 and the associated circuitry may be part of controller 903. Together these components form the control circuitry for the two-stage converter.

When switch Q1 is turned off by controller 903 (upon reaching the peak current limit set by error amplifier 904), the current flowing through inductor L1 transfers to the parallel combination of diode D3 and the intrinsic body diode of switch Q2 (which has resistor R2 in series therewith). Switch Q2 may be turned on as soon as diode D3 starts to conduct, which will be a zero voltage switching (ZVS) transition. Thus, switch Q2 does not experience any capacitive switching losses. In some embodiments, switch Q2 may be sized to be somewhat smaller than switch Q1 and may thus have higher on resistance. As a result, diode D3 may carry most of the inductor current. However, as alluded to above, if switch Q2 has a sufficiently low on resistance, it can be used as synchronous rectifier and, in at least some embodiments freewheeling diode D3 may be omitted. However, such choice may be a function of design goals and cost constraints for a particular application.

Once the energy stored in buck inductor L1 is depleted, the current flowing through diode D3 falls to zero. Then, the current in the inductor reverses, as a result of energy stored in capacitor C2, which drives the reverse current through switch Q2 (and series resistor R2). The voltage drop across resistor R2 (i.e., signal CS2) may be used to provide a reverse current (I_rev) sense signal to controller 903. When reverse current sense signal CS2 reaches a predetermined threshold (corresponding to a desired level of reverse current), switch Q2 may be turned off by controller 903. The energy stored in inductor L1 as a result of the reverse current may cause the drain node of switch Q2 to rise high until the effective capacitance across switch Q1 is discharged. Then, switch Q1 may turned on by control circuit 903 in a ZVS transition. It will be appreciated that the reason to allow reverse current through inductor L1 is to achieve ZVS turn on for switch Q1.

In many cases, power converters intended for low power consumer electronics applications are configured to operate over a wide range of utility input AC voltage. For example, it is not uncommon for "universal" adapters to operate with an input voltage ranging from 90Vac to 265Vac. As a result, the rectified and bulk capacitor filtered DC bus voltage may vary widely. For example, when low frequency ripple across the bulk capacitor is accounted for, the DC bus voltage may vary between 80Vdc and 375Vdc. The lowest input DC bus voltage across the bulk capacitor may, for example correspond with a 90Vac supply, at maximum load, as a valley of the DC bus voltage. The lowest DC bus voltage may be manipulated to some degree based on the selection of the bulk filter capacitor value. For embodiments employing two stage converter 900 illustrated in FIG. 9, buck pre-regulator 901 will always have a less than unity gain. In other words, the output voltage of buck pre-regulator 901 will always be lower than its input voltage, and thus for "universal" adapters as described above, its output will be lower than the lowest input DC voltage, e.g., <80Vdc. In some embodiments, the maximum duty cycle of a buck converter may be kept in the range of 90% to 95% for better control on regulation. Thus, for some embodiments, the output voltage of the buck pre-regulator may be less than ~72V. Some embodiments employing relatively lower capacitance values for the DC bus bulk capacitor may see even lower voltages. Such factors should be taken in to consideration when deciding the operating buck output voltage for an application employing a two stage converter like that illustrated in FIG. 9.

In the following discussion, an example embodiment will be used to explain operation of the two stage converter 900. In the illustrated example, the DC input voltage may range from 80Vdc to 375Vdc, and the DC_output voltage may be 12Vdc at 5 A maximum (i.e., a 60 W converter), which might be used as an adapter for a mid-range consumer laptop or similar load. Because half bridge resonant bus converter 900 operates at substantially unity gain, its transformer TX1 may be chosen to have a turns ratio of Np:Ns=3:1, where Np is the number of primary turns, and Ns is the number of secondary turns. Because the primary winding sees half of the input voltage because of splitting capacitors Cr3 and Cr4, the effective gain of half bridge resonant converter 902 is 6. Thus, to achieve a 12V output voltage, the expected voltage regulation level of the buck pre-regulator 901 is ~72V. In practice, the voltage may be slightly higher than 72V due to voltage drops in various resistive circuit elements and output rectifier diodes. However, for purposes of the following explanation, such voltage drops are neglected.

Buck Pre-Regulator

In a boundary mode buck regulator, power is delivered to the load and energy is stored in buck inductor L1 during the active (i.e., "on") time of power control switch Q1. When switch Q1 is turned off, energy stored in L1 is entirely delivered to the load. Once the buck inductor L1 is completely discharged, in absence of switch Q2, reverse current naturally builds up in inductor L1 by drawing current from the energy stored in capacitor C2 because of the resonant action between inductor L1 and the effective parasitic capacitance seen at the input node of buck inductor L1. Such parasitic capacitance may include the intrinsic capacitance of freewheeling diode D3 and the intrinsic "drain to source" capacitance of MOSFET Q1. If the voltage across capacitor C2 is higher than half of the buck regulator input voltage (i.e., the buck converter duty cycle is greater than 50% or 0.5), the resonant ringing can completely discharge the effective parasitic capacitance at the input node of inductor L1. In other words, the valley of the resonant ring voltage across switch Q1 itself can allow ZVS operation.

Thus, control circuit 903 may be configured to compare the input voltage of the buck pre-regulator 901 with its output voltage appearing across capacitor C2. Whenever the output voltage is higher than half of input voltage (i.e., duty cycle >0.5), operation of reverse current control switch Q2 can be disabled. In this mode, buck pre-regulator power control switch Q1 may be turned on when its drain to source voltage drops to zero volts because of the natural resonant ringing. This is, by definition, a zero voltage switching (ZVS) event. This operation may be achieved by directly or indirectly sensing the zero voltage event, or by using a timing signal based on the resonant time of the circuit once buck inductor L1 is detected to be discharged.

Alternatively, in at least some embodiments, instead of disabling operation of reverse current control switch Q2, it may instead be allowed to carry a small amount of predetermined reverse current (I_rev_th) when buck converter operates at a duty cycle >0.5, where I_rev_th≥0. This reverse current flowing in switch Q2 may be sensed by a signal voltage (I_rev) dropped across resistor R2. This can significantly simplify the control operation. Reverse current control switch Q2 may thus be turned off when the set minimum reverse current is built in buck inductor L1 based on the CS2 signal sensed across resistor R2. When reverse current control switch Q2 is turned off, this interruption in reverse current in buck inductor L1 can cause the drain voltage of reverse current control switch Q2 to rise until the capacitance at the input node of buck inductor L1 is completely discharged, allowing power control switch Q1 to be turned on in a ZVS condition.

Because the input voltage in the above-discussed example varies between 80 VDC to 375 VDC, the reverse current allowed in buck inductor L1 can be at a fixed low level when input voltage is substantially below 144V, as it will cause the duty cycle of the buck to be >50%. In practical implementations, the exact voltage level when the reverse current will be unable to achieve ZVS operation for the target output voltage may be found through bench testing. This may be identified as a threshold voltage (Vth) above which the reverse current is required to increase. Normally threshold voltage Vth will correspond to a point where the duty cycle of the buck converter will drop below 50%. From this level of Vth and upward, the reverse current is increased as input voltage increases. Reverse current in buck inductor L1 needs to be highest when the buck pre-regulator is operating at maximum DC input voltage.

Figure 10:
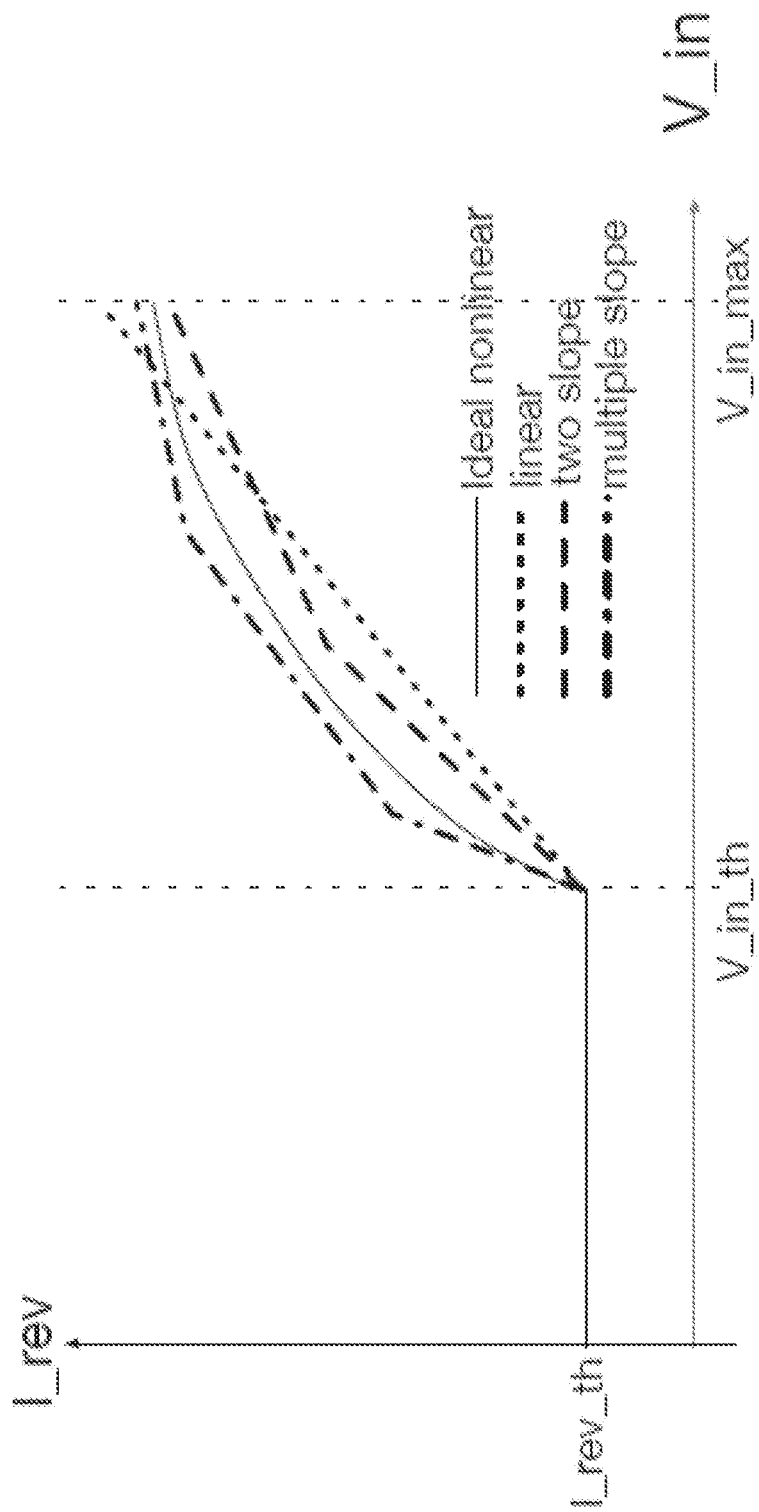
FIG. 10 illustrates various possible relationships of reverse current with input voltage for a buck pre-regulator stage.

This increase in reverse current may have a linear or a non-linear relationship with input voltage from the threshold point Vth, with a slope determined by the nature of capacitance behavior at this node. FIG. 10 illustrates various possible relationships of reverse current I_rev with input voltage V_in. Normally, MOSFETS and diodes exhibit reducing capacitance as the reverse voltage across it increases. Conversely, parasitic circuit capacitances associated with the printed circuit board (PCB) layout and transformer may stay constant over such voltage variation. In some embodiments, the slope of the increasing reverse current curve may be simplified and linearized based on hardware testing. By implementing a digital controller, higher granularity of reverse current can be achieved.

The operational sequence of two stage converter 900 as depicted in FIG. 9 may be explained as follows. For purposes of the following description, it is assumed that all operating bias voltages are available before the start up sequence. At initialization, buck converter switches Q1 and Q2 are kept off, while operation of resonant bus converter switches Q3 and Q4 is initiated. These two switches may be switched at a predetermined frequency and duty cycle that may be determined based on the principles explained above. To summarize, resonant capacitors C3 and C4 may be selected such that the half resonant frequency of the resonant tank circuit comprised of C3, C4 and total leakage inductance of transformer TX1, including external parasitic inductance, (given by the equation above) is substantially equal to the on time of Q3 and Q4, which may be operated 180 degrees out of phase. Furthermore, the dead time, i.e., the time duration that both switches Q3 and Q4 are turned off, may be set such that ZVS operation of Q3 and Q4 is achieved using magnetizing current of TX1. This may require an iterative process that determines the required primary inductance of TX1 to achieve ZVS in a dead time that may, for example, be desired to be around 2% to 5% of total switching period.

When switches Q3 and Q4 start operating as described above, there will be no voltage across capacitor C2 because the buck pre-regulator power control switch Q1 has been held in a turned off condition. Thus, no current will flow through the resonant tank or the transformer. After initiating operation of resonant bus converter switches Q3 and Q4, the buck pre-regulator may be allowed to start with a "soft-start." In other words, the buck converter may start running with peak current mode control, gradually increasing the peak current until desired output voltage is reached.

As alluded to above, error amplifier 904 may be configured to compare output voltage +V_OUT with a fixed reference (+VREF). When the output voltage reaches the reference (e.g., a 12Vdc regulation voltage level), an error signal 905 may be fed to controller 903 to control the peak current of buck inductor L1 through an isolation mechanism such as an opto-coupler. Furthermore, as described above, buck pre-regulator 901 may operate in the boundary or critical conduction mode with controlled reverse current (I_rev) to achieve ZVS operation of the power control switch Q1. As a result, buck converter 901 effectively operates in a variable frequency boundary mode. Peak current may be lower at lighter loads, which causes a higher operating frequency for a given fixed input voltage. Likewise, for a fixed peak current, lower input voltage demands longer Q1 on time, corresponding to a lower operating frequency.

Buck Pre-Regulator Losses

Figure 11:
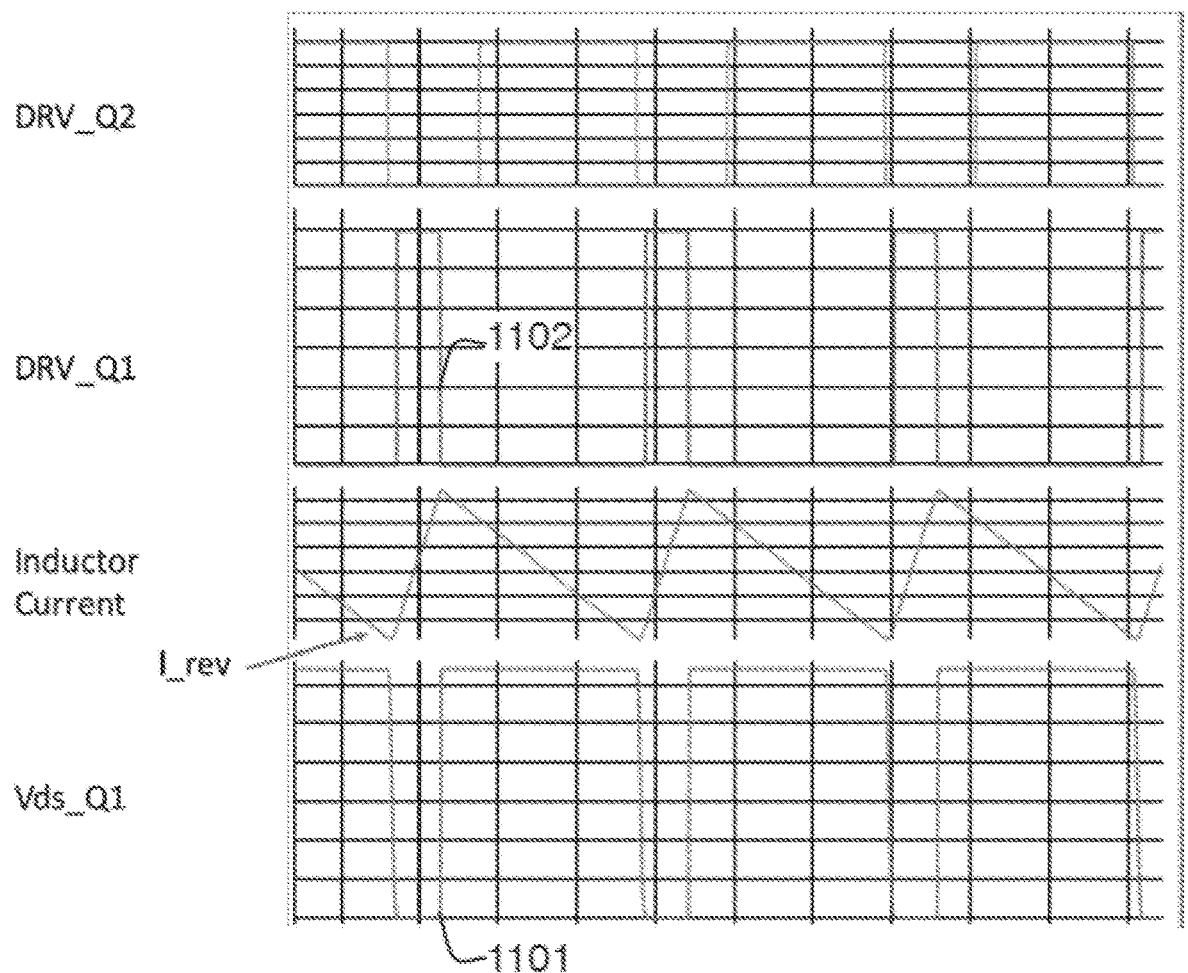
FIG. 11 illustrates some certain operating waveforms of a buck pre-regulator.

FIG. 11 illustrates some pertinent operating waveforms of buck pre-regulator 901. By comparing drain to source voltage curve 1101 with power control switch gate drive signal 1102, it can be seen that power control switch Q1 operates in ZVS condition. (That is, the switching transitions of power control switch Q1 correspond to times when the drain to source voltage across the switch is zero.) Otherwise, the power losses in buck pre-regulator 901 may be divided in three categories:

(1) Conduction losses: These losses are mainly resistive in nature and decrease as the output power is lowered. Conduction losses follow the "$I^2R$" relationship, where R is the resistivity of the circuit and I is the RMS current in the conducting element. Exemplary resistive elements in buck pre-regulator 901 include the switches, the inductor winding, circuit layout resistance, and current sensors. Additionally, diode losses are partly resistive due to intrinsic resistance of the PN junction and are also partly linear due to forward voltage drop.

(2) Switching losses: These losses are largely non-existent because of the ZVS operations described above. As a result, switching losses for the converter may neglected. Because the ZVS operation is not entirely loss-less (because of the lossy nature of switches and other circuit capacitances), associated losses may slightly increase with reduced power delivered to the load (which corresponds to increased operating frequency).

(3) Magnetizing losses in the inductor: This includes the hysteresis losses in the ferrite core. Because the buck pre-regulator 901 operates in peak current control mode, the core losses decrease as the output power delivered decreases.

(4) Bias power losses: Because operating frequency increases with decreasing load, the circuit bias power and switching device drive power may increase slightly at lower loads.

As can be seen from the foregoing description of losses, as converter power throughput decreases, the conduction and magnetic core losses also decrease, while the miscellaneous switching losses and bias power losses increase. As a result, starting at maximum rated power and continuously decreasing the output power, will result in total buck pre-regulator losses decreasing to a minimum point and then starting to increase. At this knee point, an equilibrium is achieved between the "increasing switching and bias power losses" and the "decreasing conduction and magnetic core losses." Further reduction in power losses for power throughput below this equilibrium point may be achieved by an "ON-OFF" or "burst mode" type control. In this mode, peak current may be held fixed at the knee point described above, and the entire buck pre-regulator may be alternately disabled and enabled to maintain output regulation. This mode may also be characterized as an "Energy Control Mode."

Resonant Bus Converter Power Losses

The nature of power losses in resonant bus converter 902 are somewhat different from those in buck pre-regulator 901. Because resonant bus converter 902 operates at a substantially fixed input voltage, fixed frequency, and fixed on time, it experiences fixed power losses as a result of magnetizing core losses in the transformer, bias power losses, and capacitive losses. Although resonant bus converter operation is ZVS (as described above), some capacitive losses may still be experienced because of the lossy characteristics of the parasitic capacitors.

In addition to these fixed losses, resonant bus converter 902 may also experience resistive losses in "$I^2R$" relationship. Because of the square relationship with respect to current through the converter, these losses decrease significantly as the load decreases all the way down to a no load condition. In other words, resonant bus converter 902 does not see a knee point when internal power losses start to increase, as seen by buck pre-regulator 901. This fact may have a significant impact on the efficiency of the entire power supply at very low loads. Additionally, resonant bus converter 902 may experience higher "no load input power," which may not be acceptable in some consumer electronics applications. Thus, in some embodiments, it may be desirable to operate the resonant bus converter in an ON-OFF or "burst" mode to reduce average losses in the power converter at very low loads. However, for at least the reasons described below, this may be a tricky proposition.

"Enhanced" Two-Stage Converter Operation

Figure 12:
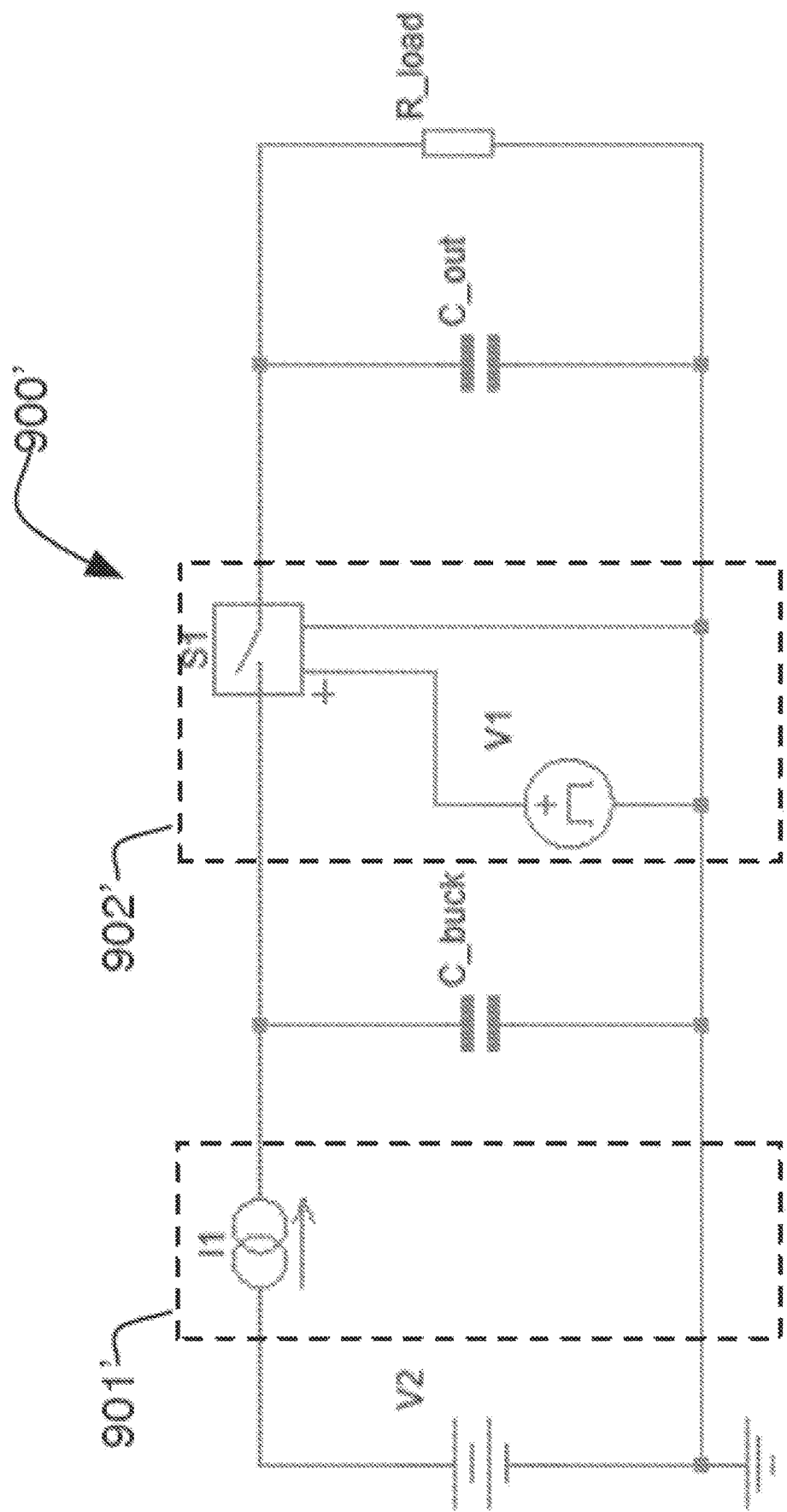
FIG. 12 illustrates a simplified schematic of a two-stage converter including a buck pre-regulator and a bus converter.

Described below is a control technique for reducing overall losses associated with the two-stage converter 900 depicted in FIG. 9. Converter 900 can be simplistically represented as converter 900' as shown in FIG. 12 (ignoring the galvanic isolation associated with transformer TX1). Because buck pre-regulator 901 operates in boundary mode with peak current mode control, the current delivered by buck pre-regulator 901 is directly proportional to the output load current drawn by load resistor R_load. Thus, buck pre-regulator stage 901 is represented in FIG. 12 as current source I1 (901'). Similarly, resonant bus converter 902' may be represented by switch S1, which simply connects and disconnects current source I1 to the output capacitor C_out and R_load. Of course, bus converter 902/902' has a fixed gain based on the turns ratio of transformer TX1, but that gain is neglected for purposes of the present discussion because it is not necessary to explain the operating concept. It should be noted that the bus converter 902' represented by switch S1 operates substantially at 100% duty cycle, neglecting the short dead times in between switching of the two control switches.

A current source can never be allowed to operate in open circuit mode, because this may result in severe high voltages. As shown in FIG. 12, capacitor C_buck can allow for the short dead time/open circuit situation of the bus converter 902'/S1. In other words, capacitor C_buck can absorb the energy delivered by the current source I1 during the short off-time intervals of S1 without creating catastrophic situation. This will increase the voltage across the capacitor and appearing at the input of bus converter 902'. However, such open circuit situations are quite short, for example no more than a 5%~10% duty cycle, so the voltage rise can be acceptable. However, in practice, it would be better if bus converter 902' were not allowed to shut down (thus creating an open circuit) whenever buck pre-regulator 901' is operating.

Described below is a control technique that allows for safe operation of buck pre-regulator 901/901' and resonant bus converter 902/902' in an ON-OFF or BURST mode when under light load conditions. By characterizing the hardware of buck pre-regulator 901/901', the knee point at which this first power stage should enter ON-OFF mode may be determined. This knee point will correspond to a particular output current, for example. At this point, the minimum peak current command for buck pre-regulator 901/901' may be set by a control signal (V_comp) generated by error amplifier 904 (FIG. 9). When the peak current control signal reaches a pre-set lower threshold "V_burst_1," buck pre-regulator 901/901' may disabled. Subsequently, resonant bus converter 902/902' may also be disabled after completing the ongoing last switching cycles of control switches Q3 and Q4 (FIG. 9).

Once both stages (i.e., buck pre-regulator 901/901' and resonant bus converter 902/902') are disabled, the associated losses in these two power stages will go to zero. Output capacitor C_out can continue to deliver power to the load until the output voltage falls below a set regulation level. An output voltage below the set regelation level can cause control signal 905 delivered by error amplifier 904 to increase. When the peak current control signal reaches a pre-set higher threshold "V_burst_2," buck pre-regulator 901/901' and the resonant bus converter 902/902' may be re-enabled. The difference between the two peak current control thresholds V_burst_1 and V_burst_2 provides hysteresis for the ON-OFF/burst mode which can enhance stability and predictability of the operation. Additionally, the above-described technique prevents buck pre-regulator 901/901' from operating in an open circuit mode, thereby preventing a catastrophic high voltage condition.

Variations of the above-described control technique are also possible. For example:

(1) Upon sensing a lower control voltage (V_comp) threshold "V_burst_1", buck pre-regulator 901/901' and resonant bus converter 902/902' may be disabled simultaneously. Both converters may be enabled again when a higher control voltage threshold of "V_burst_2" is reached.

(2) Upon sensing a lower control voltage threshold "V_burst_1", buck pre-regulator 901/901' may be disabled first, with resonant bus converter 902/902' being disabled after allowing a fixed number of switching cycles M switching cycles, with M is greater than or equal to 0. When a higher control voltage threshold of "V_burst_2" is reached, the resonant bus converter 902/902' may be enabled first, and then buck pre-regulator 901/901' may be enabled after N switching cycles of the Bus Converter, where N is greater than or equal to 0.

Figure 13:
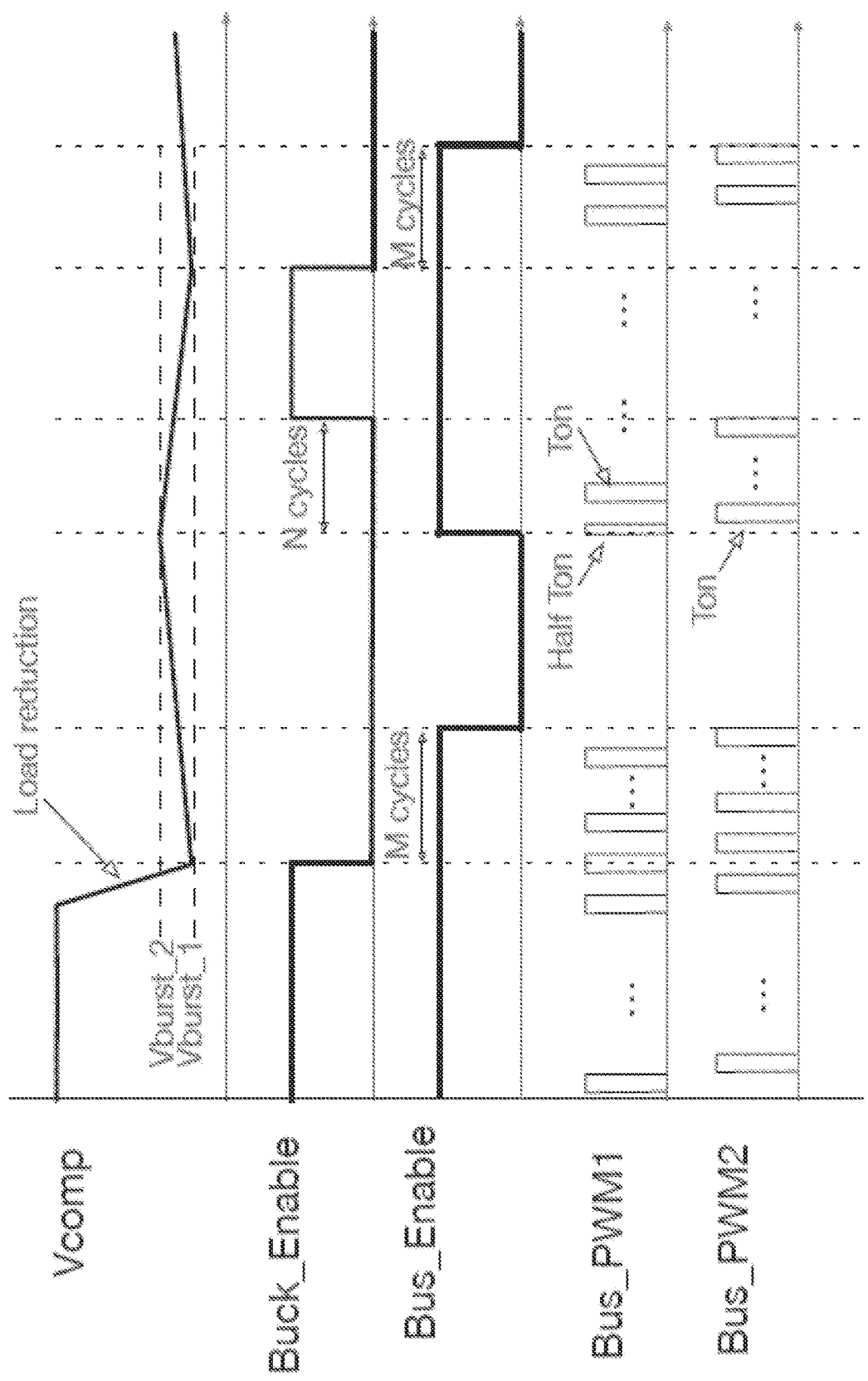
FIG. 13 illustrates a timing diagram showing ON-OFF/burst mode operation as the power output gradually decreases down to the knee point.

FIG. 13 illustrates a timing diagram showing ON-OFF/burst mode operation as the power output gradually decreases down to the knee point. V_comp is the control voltage delivered by error amplifier 904, which sets the peak current level of the buck pre-regulator 901/901'. Bus_PWM1 and Bus_PWM2 are the two complementary drive signals for resonant bus converter switches Q3 and Q4. FIG. 13 shows the behavior of V_comp at the knee point, when ON-OFF/burst control mode is activated. The time duration it takes for V_comp to increase from V_burst_1 to V_burst_1 and vice-versa is a function of output load on the two-stage converter and the speed of the error amplifier control loop. Further, to prevent unipolar DC flux in the transformer TX1, the ON duration of first pulse of the relevant Bus Converter switch may be reduced to half its normal duration, for example, by blanking first half time of its normal ON duration. This can be seen in FIG. 13 during the first pulse of BUS_PWM1 when it is enabled during the ON-OFF mode.

Thus, this two-stage converter, when operated as described above, can deliver high efficiency across a wide range of loading conditions. Because all of its power switches operate in ZVS mode, higher switching frequency operation may be employed, which may advantageously allow application of new band-gap semiconductor devices, such as Gallium Nitride (GaN) devices.

The foregoing describes exemplary embodiments of two-stage power converters employing a buck pre-regulator and a resonant bus converter. Such systems may be used in a variety of applications but may be particularly advantageous when used in conjunction with power adapters for consumer electronics devices. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A two stage power converter, comprising:
a buck pre-regulator stage configured to receive an input voltage and produce an intermediate voltage lower than the input voltage;
a resonant bus converter stage configured to receive the intermediate voltage produced by the buck pre-regulator stage and produce an output voltage that is a fixed multiple of the intermediate voltage; and
control circuitry coupled to the buck pre-regulator stage and the resonant bus converter stage that temporarily and intermittently disables and enables switching of the buck pre-regulator stage and the resonant bus converter stage responsive to a load condition at or below a point at which switching and bias power losses of the buck pre-regulator stage and conduction and magnetic core losses of the buck pre-regulator stage are in equilibrium.

2. The two stage power converter of claim 1 wherein the resonant bus converter stage is a half-bridge comprising:
first and second switching devices coupled in series across the intermediate voltage;
first and second resonant capacitors coupled in series across the intermediate voltage; and
a transformer having a primary winding coupled between a junction of the first and second switching devices and a junction of the first and second resonant capacitors, the transformer also having at least one secondary winding coupled to an output of the two stage converter by one or more rectifier devices;
wherein:
the first and second switching devices are alternately operated 180 degrees out of phase at a duty cycle of about 50% with a dead time to prevent cross-conduction, thereby generating a sinusoidal current in the transformer primary winding; and the resonant bus converter stage is configured to achieve zero voltage switching of the first and second switching devices.

3. The two stage power converter of claim 2 wherein the first and second resonant capacitors are configured to resonate with parasitic inductances of the converter.

4. The two stage power converter of claim 2 wherein the first and second resonant capacitors are configured to resonate with a discrete inductor.

5. The two stage power converter of claim 1 wherein the resonant bus converter stage is a full-bridge comprising:

first and second switching devices coupled in series across the intermediate voltage;

third and fourth switching devices coupled in series across the intermediate voltage; and a resonant circuit including at least a resonant capacitor and a transformer primary winding coupled between a junction of the first and second switching devices and a junction of the third and fourth switching devices, wherein the transformer also having at least one secondary winding coupled to an output of the two stage converter by one or more rectifier devices, wherein:
the first and third switching devices and the second and fourth switching devices are alternately operated 180 degrees out of phase at a duty cycle of about 50% with a dead time to prevent cross-conduction, thereby generating a sinusoidal current in the transformer primary winding; and the resonant bus converter stage is configured to achieve zero voltage switching of the first and second switching devices.

6. The two stage power converter of claim 5 wherein the resonant circuit includes a discrete inductor.

7. The two stage power converter of claim 1 wherein the control circuitry is configured to detect the load condition at or below a point at which switching and bias power losses of the buck pre-regulator stage and conduction and magnetic core losses of the buck pre-regulator stage are in equilibrium by detecting a lower disable control signal at a load current below a first predetermined threshold and a higher enable control signal.

8. The two stage power converter of claim 1 wherein the control circuitry is configured to enter controlled burst mode responsive to a control signal reaching a first threshold and wherein the control circuitry is configured to exit controlled burst mode responsive to the control signal reaching a second threshold.

9. The two stage power converter of claim 1 wherein temporarily and intermittently disabling and enabling switching of the buck pre-regulator stage and the resonant bus converter stage comprises simultaneously disabling and enabling switching of the buck pre-regulator stage and the resonant bus converter stage in response to respective disable and enable control signals.

10. The two stage power converter of claim 1 wherein temporarily and intermittently disabling and enabling switching of the buck pre-regulator stage and the resonant bus converter stage comprises first disabling switching of the buck pre-regulator stage and subsequently disabling the resonant bus converter stage in response to a disable control signal and first enabling switching of the resonant bus converter stage and subsequently enabling the buck pre-regulator stage in response to an enable control signal.

11. A method of operating a two-stage converter having a buck pre-regulator stage and a resonant bus converter stage, the method comprising adaptable soft switching boundary mode operation of the buck pre-regulator stage, including:

turning on a power control switching device of the buck pre-regulator stage, causing a current flow through a buck inductor of the buck pre-regulator stage;

turning off the power control switching device when current through the buck inductor reaches a peak current corresponding to a peak current command derived from an output voltage of the two stage converter;

turning on a reverse current control switching device of the buck pre-regulator stage after turning off the power control switching device; and responsive to a reverse current through the reverse current control switching device, turning on the power control switching device in a zero voltage switching transition.

12. The method of claim 11 further comprising performing controlled burst mode operation of the resonant bus converter, including:

detecting a load condition at or below a point at which switching and bias power losses of the buck pre-regulator stage and conduction and magnetic core losses of the buck pre-regulator stage are in equilibrium; and responsive to such load condition, temporarily and intermittently disabling and enabling switching of the buck pre-regulator stage and the resonant bus converter stage.

13. The method of claim 12 wherein detecting the load condition at or below a point at which switching and bias power losses of the buck pre-regulator stage and conduction and magnetic core losses of the buck pre-regulator stage are in equilibrium comprises detecting a lower disable control signal at a load current below a first predetermined threshold and a higher enable control signal.

14. The method of claim 12 further comprising entering controlled burst mode responsive to a control signal reaching a first threshold and exiting controlled burst mode responsive to the control signal reaching a second threshold.

15. The method of claim 12 wherein temporarily and intermittently disabling and enabling switching of the buck pre-regulator stage and the resonant bus converter stage comprises simultaneously disabling and enabling switching of the buck pre-regulator stage and the resonant bus converter stage in response to respective disable and enable control signals.

16. The method of claim 12 wherein temporarily and intermittently disabling and enabling switching of the buck pre-regulator stage and the resonant bus converter stage comprises first disabling switching of the buck pre-regulator stage and subsequently disabling the resonant bus converter stage in response to a disable control signal and first enabling switching of the resonant bus converter stage and subsequently enabling the buck pre-regulator stage in response to an enable control signal.

17. A method of operating a two-stage converter having a buck pre-regulator stage and a resonant bus converter stage, the method comprising performing controlled burst mode operation of the resonant bus converter stage by temporarily and intermittently disabling and enabling switching of the buck pre-regulator stage and the resonant bus converter stage responsive to a load condition at or below a point at which switching and bias power losses of the buck pre-regulator stage and conduction and magnetic core losses of the buck pre-regulator stage are in equilibrium.

18. The method of claim 17 wherein detecting the load condition at or below a point at which switching and bias power losses of the buck pre-regulator stage and conduction and magnetic core losses of the buck pre-regulator stage are in equilibrium comprises detecting a lower disable control signal at a load current below a first predetermined threshold and a higher enable control signal.

19. The method of claim 17 further comprising entering controlled burst mode responsive to a control signal reaching a first threshold and exiting controlled burst mode responsive to the control signal reaching a second threshold.

20. The method of claim 17 wherein temporarily and intermittently disabling and enabling switching of the buck pre-regulator stage and the resonant bus converter stage comprises simultaneously disabling and enabling switching of the buck pre-regulator stage and the resonant bus converter stage in response to respective disable and enable control signals.

21. The method of claim 17 wherein temporarily and intermittently disabling and enabling switching of the buck pre-regulator stage and the resonant bus converter stage comprises first disabling switching of the buck pre-regulator stage and subsequently disabling the resonant bus converter stage in response to a disable control signal and first enabling switching of the resonant bus converter stage and subsequently enabling the buck pre-regulator stage in response to an enable control signal.

22. A two stage power converter comprising a buck pre-regulator stage and a resonant converter stage, wherein:
the buck pre-regulator stage is configured to receive an input voltage and produce an intermediate voltage lower than the input voltage, the buck pre-regulator stage further comprising:
a first switching device and a second switching device coupled in series across the input voltage, wherein the first switching device is a power control switch and the second switching device is a reverse current control switch;
a buck inductor coupled between a junction of the first and second switching devices and an input of the resonant bus converter stage; and
a free-wheeling diode coupled in parallel with the reverse current control switch;
a first current sensor coupled to the control circuitry and configured to sense the buck pre-regulator stage current during an on time of the first switching device; and
a second current sensor coupled to the control circuitry and configured to sense freewheeling current during an off time of the first switching device;
the resonant bus converter stage is configured to receive the intermediate voltage produced by the buck pre-regulator stage and produce an output voltage that is a fixed multiple of the intermediate voltage; and
control circuitry coupled to the buck pre-regulator stage and the resonant bus converter stage, wherein the control circuitry is configured to perform controlled burst mode operation of the resonant bus converter stage by:
turning on the first switching device, causing a current flow through the buck inductor;
comparing an output of the first current sensor to a peak current command derived by the control circuit from an output voltage of the two-stage converter;
turning off the first switching device when current through the buck inductor reaches the peak current;
turning on the second switching device after turning off the first switching device;
detecting, using the second current sensor, a reverse current through the second switching device; and
responsive to the reverse current, turning on the first switching device in a zero voltage switching transition.

23. The two stage power converter of claim 22 wherein the first current sensor is a current sense resistor connected in series with at least the buck inductor during an on time of the first switching device.

24. The two stage power converter of claim 22 wherein the second current sensor is a current sense resistor connected in series with the second switching device.

* * * * *